(12) United States Patent
Mallart

(10) Patent No.: US 11,388,668 B2
(45) Date of Patent: *Jul. 12, 2022

(54) METHOD FOR CONTROLLING, VIA A TERMINAL AND A SERVER, A STANDBY MODE OF A COMMUNICATION MODULE OF THE TERMINAL

(71) Applicant: SIGFOX, Labege (FR)

(72) Inventor: Raoul Mallart, Paris (FR)

(73) Assignee: SIGFOX, Labege (FR)

( * ) Notice: Subject to any disclaimer, the term of this patent is extended or adjusted under 35 U.S.C. 154(b) by 27 days.

This patent is subject to a terminal disclaimer.

(21) Appl. No.: 17/133,386

(22) Filed: Dec. 23, 2020

(65) Prior Publication Data

US 2021/0120493 A1 Apr. 22, 2021

Related U.S. Application Data

(63) Continuation-in-part of application No. 15/763,117, filed as application No. PCT/FR2016/052509 on Sep. 30, 2016, now Pat. No. 10,932,320.

(30) Foreign Application Priority Data

Sep. 30, 2015 (FR) .................................. 15 59262

(51) Int. Cl.
*H04W 52/02* (2009.01)
*H04L 101/654* (2022.01)
*H04L 101/622* (2022.01)

(52) U.S. Cl.
CPC ..... *H04W 52/0229* (2013.01); *H04L 61/6022* (2013.01); *H04L 61/6054* (2013.01); *H04W 52/0274* (2013.01)

(58) Field of Classification Search
CPC .. Y02D 30/70; H04W 68/02; H04W 52/0209; H04W 48/16; H04W 8/18; H04W 76/28; H04W 88/06
See application file for complete search history.

(56) References Cited

U.S. PATENT DOCUMENTS

| 2011/0053619 A1* | 3/2011 | Shaheen | H04L 67/12 |
| | | | 455/466 |
| 2013/0267224 A1* | 10/2013 | Krishnaswamy | H04W 36/14 |
| | | | 455/426.1 |

(Continued)

FOREIGN PATENT DOCUMENTS

| EP | 2 550 817 A2 | 1/2013 |
| EP | 2 755 429 A1 | 7/2014 |
| EP | 2 884 812 A1 | 6/2015 |

OTHER PUBLICATIONS

Ha etal, "A Design of Smart Radio Research Platform for Universal Access in a Multi-RAT Environment", IEEE, 2020 (Year: 2020).*

(Continued)

*Primary Examiner* — Omer S Mian
(74) *Attorney, Agent, or Firm* — Im IP Law; Chai Im; C. Andrew Im

(57) ABSTRACT

A method for controlling, via a terminal, a standby mode of a first communication module of the terminal. The first communication module exchanges data with a first wireless access network. The terminal includes a second communication module, which exchanges data with a second wireless access network. The second communication module has a maximum data rate that is lower than a maximum data rate of the first communication module. The terminal belongs to a group of terminals sharing a set of one or several identification codes for connecting to the first wireless network. When the first communication module is in standby mode, the second communication module listens to a downlink (Continued)

between the second wireless access network and the terminal. The first communication module is activated and connects to the first wireless network using the indicated identification code in the activation request received from the server.

13 Claims, 4 Drawing Sheets

(56) References Cited

U.S. PATENT DOCUMENTS

| | | | |
|---|---|---|---|
| 2015/0086005 A1* | 3/2015 | Kechichian | H04M 9/082 379/392.01 |
| 2015/0301950 A1 | 10/2015 | Li et al. | |
| 2015/0304950 A1* | 10/2015 | Li | H04W 52/0216 370/311 |
| 2016/0239001 A1* | 8/2016 | Chin | F24F 11/30 |

OTHER PUBLICATIONS

Ha et al., A Design of Smart Radio Research Platform for Universal Access in a Multi-RAT Environment, 11th ISCIT 2011, pp. 178-183. (Previously cited in office action of parent application).

* cited by examiner

METHOD FOR CONTROLLING, VIA A TERMINAL AND A SERVER, A STANDBY MODE OF A COMMUNICATION MODULE OF THE TERMINAL

RELATED APPLICATIONS

This application is a continuation-in-part application of U.S. application Ser. No. 15/763,117 filed Mar. 25, 2018, which is a § 371 application from PCT/FR2016/052509 filed Sep. 30, 2016, which claims priority from French Patent Application No. 15 59262 filed Sep. 30, 2015, each of which is incorporated herein by reference in its entirety

TECHNICAL FIELD

The present invention belongs to the field of telecommunications, and relates more particularly to the management of the electrical consumption of a terminal of a wireless communication system.

BACKGROUND OF THE INVENTION

The present invention is applied particularly advantageously, although without any limitation, to wireless communication systems for M2M (acronym for "Machine-to-Machine") or "Internet of Things" (IoT) applications.

In the context for example of the IoT, every everyday object is able to become a communicating object, and is equipped for this purpose with a terminal designed to transmit data to a wireless access network of a wireless communication system.

In such a context, it is important to have solutions that are both inexpensive (and therefore not very complex) and at the same time consume little electric power. This makes it possible for example to make many everyday objects able to communicate, without having a significant impact on their production cost, and above all without having too much of an impact on their autonomy when they are battery-operated.

Wireless communication systems are known that are optimized for M2M or IoT applications, and that make it possible to simultaneously serve, in a given zone, a very large number of terminals equipped with suitable communication modules, and that furthermore exhibit very low electrical consumption.

For example, ultra-narrowband wireless communication systems are known. The term "Ultra Narrow Band" (UNB) is understood to mean that the instantaneous frequency spectrum of the signals exchanged between the terminals and the wireless access network has a frequency width of less than two kilohertz, or even less than one kilohertz. Such signals are able to be transmitted with very low electrical consumption. The electrical consumption is also reduced by the fact that the terminals transmit signals without having to associate themselves beforehand with one or more base stations of said wireless access network. Thus, the terminal does not need to perform regular measurements to determine the most suitable base station for receiving its signals. The complexity hinges on the wireless access network, which must be capable of receiving signals that can be transmitted at arbitrary instants in time and on arbitrary frequencies.

Such UNB wireless communication systems therefore have, on the terminal side, an electrical consumption that is perfectly suitable for M2M or IoT applications.

By contrast, the use of ultra-narrowband signals limits the maximum throughput that can be achieved for exchanging data between a terminal and the wireless access network of a UNB wireless communication system.

Although such a limitation of the maximum throughput does not necessarily pose a problem for the majority of M2M and IoT applications, there may however be scenarios where it is necessary to be able to have a higher maximum throughput, in order in particular to be able to exchange a large amount of data more easily between said terminal and the wireless access network. For example, on a downlink of the wireless access network to the terminal, a higher maximum throughput would make it possible to transfer a firmware update for said terminal.

Numerous wireless communication systems are known that have a maximum throughput far higher than that of UNB wireless communication systems.

Mention may be made in particular of the GPRS, EDGE, UMTS, HSPA, HSPA+, LTE, CDMA2000, etc. wireless communication systems, which may be termed "high-throughput" in comparison with UNB wireless communications systems, which, by contrast, may be termed "low-throughput".

However, one drawback of high-throughput wireless communication systems lies in the fact that they are accompanied, on the terminal side, by an electrical consumption that may prove to be too high for battery-operated objects. Furthermore, the number of terminals able to be connected simultaneously, in a given zone, to a high-throughput wireless communication system is generally limited, and far lower than the number of terminals able to be served, in this same zone, by a low-throughput wireless communication system. In addition, the associated cost is generally too high for M2M or IoT applications, insofar as each terminal has to have a personal identification code, for example an IMSI ("International Mobile Subscriber Identity") subscriber number, enabling it to connect to the wireless access network of the high-throughput wireless communication system.

To benefit from the respective advantages offered by low-throughput wireless communication systems (for example UNB) and by high-throughput wireless communication systems (GPRS, EDGE, UMTS, HSPA, HSPA+, LTE, CDMA2000, etc.), it has been contemplated to equip some terminals with two communication modules, namely a low-throughput communication module and a high-throughput communication module. Although the electrical consumption of the high-throughput communication module may then be reduced by limiting use only to those exchanges requiring a high throughput, it may still remain too high for some battery-operated objects, in particular if the intended autonomy is long, of the order of a few years. Furthermore, the cost associated with using the high-throughput communication module remains too high for M2M or IoT applications.

Patent application EP 2755429 A1 provides a solution making it possible to reduce the electrical consumption of such a terminal, in which the high-throughput communication module is put into standby mode and is woken by way of the low-throughput communication module. However, this solution does not address the problem of cost associated with using a high-throughput communication module for M2M or IoT applications.

SUMMARY OF THE INVENTION

The aim of the present invention is to rectify all or some of the limitations of the prior art solutions, in particular those outlined above, by providing a solution that makes it possible both to reduce the electrical consumption of the high-throughput communication module of the terminal and to reduce the cost associated with using said high-throughput communication module.

To this end, and according to a first aspect, the invention relates to a method for controlling, by a processor-based terminal, a standby mode of a first communication module of the terminal. The first communication module is configured to exchange data with a first wireless access network. The terminal furthermore comprises a second communication module configured to exchange data with a second wireless access network, with a maximum throughput lower than a maximum throughput of the first communication module. Furthermore, the terminal belongs to a group of terminals sharing a set of one or several identification codes for connecting to the first wireless access network. The control method includes:

listening, by way of the second communication module, to a downlink between the second wireless access network and the terminal in response to a determination that the first communication module is in standby mode, receiving, via the second communication module, an activation request, transmitted by a processor-based server linked to the second wireless access network, wherein the activation request comprises an indication of an available identification code: activation of the first communication module from among the set of shared identification codes, and activating the first communication module to connect to the first wireless access network using the indicated identification code.

The terminal thus listens to the downlink by way of the second communication module. If the server transmits an activation request, the terminal activates the first communication module, which then exits standby mode and is available to exchange data with the first wireless access network. In the opposite case, the first communication module remains in standby mode.

As a result, the activation of the first communication module is controlled remotely by the server. Such provisions are advantageous in that a server remote from the terminal may have access to information to which the terminal does not have access and that can be taken into account to decide whether the first communication module should be activated.

In particular, in order to reduce the cost associated with using the first communication module, the latter uses, to connect to the first wireless access network, an identification code that is shared by a group of terminals. Specifically, it is understood that such a solution is more economical than the prior art solutions, in which each terminal has to have a personal identification code. By contrast, the first communication module of said terminal will not be able to connect to the first wireless access network if the shared identification code is already being used by another terminal of the group, and there is therefore no need to activate the first communication module in such a case. Advantageously, the server remotely controls the activation of the first communication module of the terminal depending on the availability, or lack thereof, of said shared identification code.

For example, the server may know whether a large amount of data, for example a firmware update for the terminal, has to be transferred to said terminal by way of the first wireless access network. According to another example, it is possible for the number of terminals that are already connected to the first wireless access network to be equal to a maximum number of terminals able to be connected simultaneously. In such a case, there is no need to activate the first communication module, even if said terminal has a large amount of data to transmit, since said terminal will not be able to connect to the first wireless access network.

In particular modes of implementation, the control method may furthermore include one or more of the following features, taken alone or in any technically feasible combination.

In particular modes of implementation, the identification codes shared by the group of terminals are IMSI subscriber numbers, MAC addresses, IP addresses or multicast group identifiers.

In particular modes of implementation, the method for controlling a standby mode by the terminal includes:

evaluating a criterion for transmitting a request to confirm activation of the first communication module, when the criterion for transmitting an activation confirmation request is met: transmitting, by way of the second communication module, an activation confirmation request to the server, the terminal listening to the downlink after having transmitted the activation confirmation request, waiting for an activation request transmitted by the server in response to said activation confirmation request.

In such a case, although the activation of the first communication module is controlled remotely by the server, the procedure that leads, or does not lead, to the activation of said first communication module is initiated by the terminal, through the transmission of the activation confirmation request. Such provisions are advantageous in that the electrical consumption associated with using the second communication module can also be controlled. Specifically, it is not necessary to listen to the downlink at all times waiting for an activation request, since the latter is transmitted in response to an activation confirmation request transmitted by the terminal. As a result, the second communication module can also be put into standby mode often.

In particular modes of implementation, evaluating the criterion for transmitting an activation confirmation request includes comparing the instant in time of the evaluation of said criterion for transmitting an activation confirmation request with a predetermined date.

In particular modes of implementation, evaluating the criterion for transmitting an activation confirmation request includes determining whether data have to be transmitted by way of the first communication module.

In particular modes of implementation, the control method includes, when the first communication module is in active mode, evaluating a criterion for returning to standby mode and, when said criterion for returning to standby mode is met, deactivating said first communication module.

In particular modes of implementation, evaluating the criterion for returning to standby mode includes determining whether data have to be exchanged by way of the first communication module.

In particular modes of implementation, evaluating the criterion for returning to standby mode includes comparing the instant in time of the evaluation of said criterion for returning to standby mode with a predetermined date.

In particular modes of implementation, evaluating the criterion for returning to standby mode includes analyzing a level of electrical energy stored in a battery of the terminal.

In particular modes of implementation, the first wireless access network and the second wireless access network are both wireless wide area networks.

In particular modes of implementation, the first communication module is compatible with at least one of the following wireless communication protocols: GPRS, EDGE, UMTS, HSPA, HSPA+, LTE, CDMA2000, IEEE 802.11, WiFi, Bluetooth, NB-IoT.

In particular modes of implementation, the second communication module transmits data in the form of ultra-narrowband signals.

According to a second aspect, the present invention relates to a terminal of a wireless communication system, including a first communication module configured to exchange data with a first wireless access network, a second communication module configured to exchange data with a second wireless access network, with a maximum throughput lower than a maximum throughput of the first communication module. The terminal belongs to a group of terminals sharing a set of one or several identification codes to connect to the first wireless network. The terminal furthermore comprises a processor configured:

listen, via the second communication module, to a downlink between the second wireless access network and the terminal in response to a determination that the first communication module is in standby mode;

receive, via the second communication module, an activation request, transmitted by a processor-based server linked to the second wireless access network, wherein the activation request comprises an indication of an available identification code from among the set of shared identification codes; and activate the first communication module to connect to the first wireless access network using the indicated identification code.

According to a third aspect, the present invention relates to a method for remotely controlling, by a processor-based server, a standby mode of a first communication module of a processor-based terminal. The server is linked to the second wireless access network, and the first communication module of the terminal is controlled in accordance with a control method according to any one of the embodiments of the invention. The remote control method comprises:

evaluating a criterion for transmitting an activation request to activate the first communication module of the terminal, including determining whether an identification code, among a set of one or several identification codes shared by the group of terminals to which said terminal belongs, is available for use by said terminal to connect to the first wireless access network; and when the criterion for transmitting an activation request is met:

transmitting, by way of the second wireless access network, the activation request to the terminal, wherein the activation request comprises an indication of available identification code from among the set of shared identification codes.

In particular modes of implementation, the remote control method may furthermore include one or more of the following features, taken alone or in any technically feasible combination.

In particular modes of implementation, the identification codes shared by the group of terminals are IMSI subscriber numbers, MAC addresses, IP addresses or multicast group identifiers.

In particular modes of implementation, the remote control method includes listening to an uplink between the terminal and the second wireless access network, and the server evaluates the criterion for transmitting an activation request after having received an activation confirmation request transmitted by said terminal.

In particular modes of implementation, evaluating the criterion for transmitting an activation request includes determining whether data have to be transmitted to the terminal by way of the first wireless access network.

In particular modes of implementation, evaluating the criterion for transmitting an activation request includes comparing a level of use, by other terminals, of the first wireless access network and/or of the server with a predetermined maximum level.

According to a fourth aspect, the present invention relates to a server comprising a processor configured to remotely control a standby mode of a first communication module of a terminal in accordance with a remote control method according to any one of the modes of implementation of the invention.

According to a fifth aspect, the present invention relates to a wireless communication system including at least one terminal according to any one of the embodiments of the invention and a server according to any one of the embodiments of the invention.

In particular embodiments, the system includes a group of terminals sharing one and the same identification code to connect to the first wireless access network.

BRIEF DESCRIPTION OF THE FIGURES

The invention will be better understood on reading the following description, given by way of wholly nonlimiting example and made with reference to the figures, in which.

In these figures, identical references from one figure to another denote identical or analogous elements. For the sake of clarity, the elements shown are not to scale, unless stated otherwise.

DETAILED DESCRIPTION OF EMBODIMENTS

Figure 1:
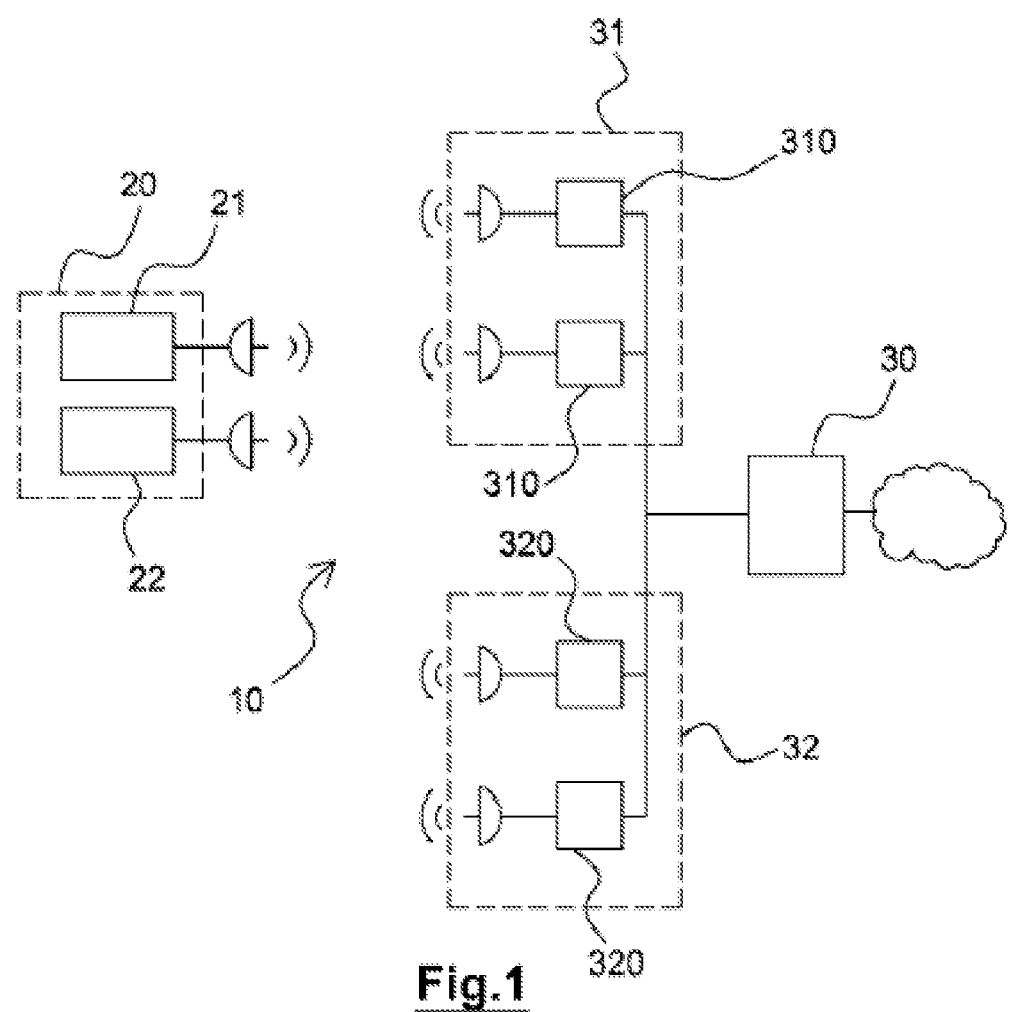
FIG. 1 shows a schematic depiction of a wireless communication system.

FIG. 1 schematically shows a wireless communication system 10 including a terminal 20.

The terminal 20 includes a first communication module 21 suitable for exchanging data with base stations 310 of a first wireless access network 31, and a second communication module 22 suitable for exchanging data with base stations 320 of a second wireless access network 32. In the example illustrated by FIG. 1, the base stations 310 of the first wireless access network 31 are all separate from the base stations 320 of the second wireless access network 32. However, in other examples, there is nothing to rule out having base stations belonging both to the first wireless access network 31 and to the second wireless access network 32, that is to say that are suitable for exchanging data with both the first communication module 21 and the second communication module 22.

The terminal 20 exchanges data with the first wireless access network 31 and the second wireless access network 32 in the form of radio signals. The term "radio signal" is understood to mean an electromagnetic wave propagating via non-wired means, the frequencies of which are contained within the traditional radio wave spectrum (a few hertz to several hundred gigahertz).

The first communication module 21 has a maximum throughput higher than that of the second communication module 22. For this reason, the first communication module 21 and the first wireless access network 31 may be termed "high-throughput" in comparison with the second communication module 22 and with the second wireless access network 32, which, by contrast, may be termed "low-throughput" in comparison with the first communication module 21 and with the first wireless access network 31. On account of this difference between their respective maximum throughputs, the second communication module 22 in principle has an electrical consumption lower than that of the first communication module 21.

The first communication module 21 and the first wireless access network 31 are for example compatible with at least one of the following wireless communication protocols: GPRS, EDGE, UMTS, HSPA, HSPA+, LTE, CDMA2000, etc.

The second communication module 22 and the second wireless access network 32 are low-throughput in comparison with the first communication module 21 and with the first wireless access network 31. For example, if the first communication module 21 and the first wireless access network 31 are compatible with the LTE wireless communication protocol, the second communication module 22 and the second wireless access network 32 may be compatible with the GPRS and/or EDGE communication protocol.

In preferred embodiments, the second communication module 22 of the terminal 20 and the second wireless access network 32 of the wireless communication system 10 exchange data in the form of ultra-narrowband (UNB) signals. Such provisions are particularly advantageous in that the electrical consumption of the second communication module 22 is then very low, and is particularly suitable for M2M or IoT applications.

In preferred embodiments of the wireless communication system 10, the first wireless access network 31 and the second wireless access network 32 are both wireless wide area networks, also called WWAN. In such a case, the terminal 20 is almost always in a zone covered both by the first wireless access network 31 and by the second wireless access network 32.

As illustrated by FIG. 1, the wireless communication system 10 also includes a server 30. In the nonlimiting example illustrated by FIG. 1, the server 30 is linked both to the first wireless access network 31 and to the second wireless access network 32. As a result, the terminal 20 is able to exchange data with the server 30 by way of said first wireless access network 31 (by way of the first communication module 21) and by way of the second wireless access network 32 (by way of the second communication module 22).

As indicated previously, the present invention relates in particular to the management of the electrical consumption of the terminal 20, and in particular the electrical consumption associated with using the first communication module 21.

In order in particular to limit the electrical consumption, the terminal 20 is able to put said first communication module 21 into standby mode. The term "standby mode" is understood to mean any mode of operation of the first communication module 21 in which it is not permitted to exchange data with the first wireless access network 31, including a flight mode or a complete shutdown of said first communication module 21 by ceasing to supply it with electric power.

Advantageously, the terminal 20 may also be adapted to put the second communication module 22 into standby mode, in order to reduce the electrical consumption of said terminal 20 to an even greater extent.

The present invention relates more particularly to the control of the standby mode of the first communication module 21 of the terminal 20, that is to say the control of the transitions from the standby mode to an active mode (in which the first communication module 21 is permitted to exchange data with the first wireless access network 31), and vice versa.

More particularly, the control of the standby mode of the first communication module 21 of the terminal 20 is distributed between the terminal 20 and the server 30, and is primarily broken down into:
  a control method 50 whose steps are executed locally by the terminal 20,
  a remote control method 60 whose steps are executed by the server 30.

In its general principle, the control of the standby mode of the first communication module 21 of the terminal 20 is based, when said first communication module 21 is in standby mode, on transmitting an activation request, by the server 30, by way of the second wireless access network 32, to the terminal 20. When the terminal 20 receives the activation request by way of the second communication module 22, said terminal 20 activates the first communication module 21. In the opposite case, the first communication module 21 remains in standby mode.

A) Method for Controlling a Standby Mode by the Terminal

Figure 2:
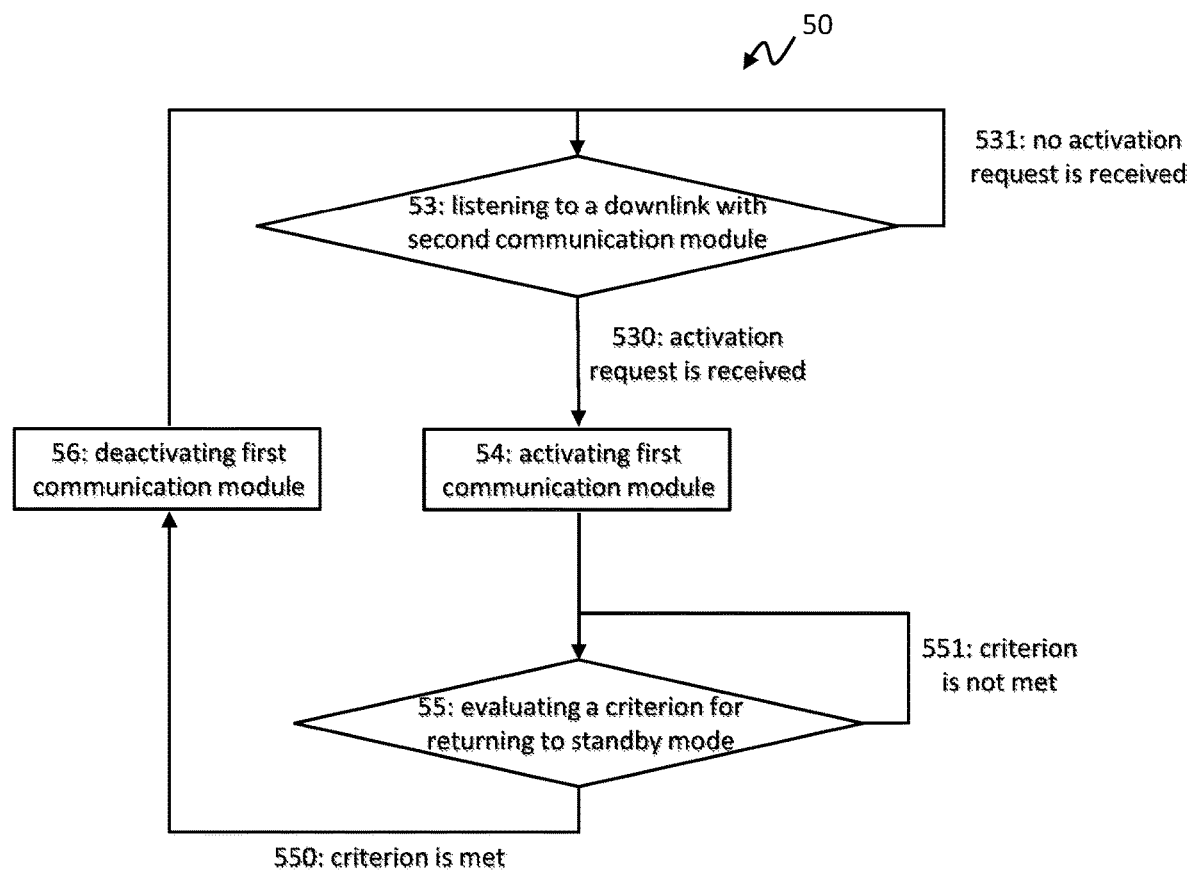
FIG. 2 shows a diagram illustrating the main steps of a method for controlling, by a terminal, a standby mode of a communication module of said terminal.

FIG. 2 schematically shows the main steps of a method 50 for controlling, by the terminal 20, a standby mode of the first communication module 21 of said terminal 20.

To this end, the terminal 20 includes in particular a control device (not shown in the figures), including one or more processors and memory storage means (magnetic hard disk, electronic memory, optical disk, etc.) in which a computer program product, in the form of a set of program code instructions to be executed in order to implement the various steps of the standby mode control method 50, is stored in memory. In one variant, the control device includes one or more programmable logic circuits (FPGA, PLD, etc.), and/or one or more specialized integrated circuits (ASIC), and/or a set of discrete electronic components, etc., designed to implement all or some of said steps of the standby mode control method 50.

In other words, the terminal 20 includes a set of means that are configured as software (specific computer program product) and/or hardware (FPGA, PLD, ASIC, discrete electronic components, etc.) in order to implement the steps of the standby mode control method 50.

As indicated previously, the control of the standby mode of the first communication module 21 of the terminal 20 is based in particular, when said first communication module 21 is in standby mode, on transmitting an activation request, by the server 30, by way of the second wireless access network 32, to the terminal 20.

On the side of the terminal 20, the standby mode control method 50 consequently includes a step 53 of listening to a downlink between the second wireless access network 32 and said terminal 20, by way of the second communication module 22.

When the terminal 20 receives, by way of the second communication module 22, an activation request transmitted by the server 30 (reference 530 in FIG. 2), the standby mode control method 50 then includes a step 54 of activating, by the terminal 20, the first communication module 21. During the activation step 54, the first communication module 21 exits standby mode for active mode, in which it can connect to the first wireless access network 31 in order to exchange data. The second communication module 22 can advantageously be put into standby mode during the step 54 of activating the first communication module 21 in order to reduce its electrical consumption.

By contrast, if no activation request is received by the terminal 20 (reference 531 in FIG. 2), the first communication module 21 is not activated and consequently remains in standby mode.

In preferred modes of implementation, and as illustrated by FIG. 2, the method 50 for controlling a standby mode by the terminal 20 may include, when the first communication module 21 is in active mode, a step 55 of evaluating a predetermined criterion for returning to standby mode. When said criterion for returning to standby mode is met (reference 550 in FIG. 2), the standby mode control method 50 includes a step 56 of deactivating said first communication module 21 by the terminal 20, during which step said first communication module 21 exits active mode for standby mode. In the opposite case (reference 551 in FIG. 2), the first communication module 21 of the terminal 20 remains in active mode.

Specifically, in order to limit the electrical consumption of the terminal 20, the first communication module 21 is again put into standby mode as soon as predetermined conditions are satisfied, and step 55 of evaluating said criterion for returning to standby mode is intended precisely to determine whether these conditions are indeed satisfied.

For example, the return to standby mode may be carried out at predetermined dates. In particular, it is possible to force a return to standby mode when no exchange of data is carried out by way of the first communication module 21 for a predetermined maximum period.

As an alternative or in addition, the criterion for returning to standby mode may be considered to be met when there are no more data to be exchanged by way of the first communication module 21.

It is also possible, as an alternative or in addition, to take account of the level of electrical energy stored in a battery (not shown in the figures) of the terminal 20. In particular, it is possible to force a return to standby mode when the level of electrical energy stored in the battery falls below a predetermined minimum level.

It should be noted that, as an alternative or in addition, the server 30 may force the first communication module 21 of the terminal 20 to return to standby mode by sending a deactivation request by way of the first wireless access network 31 or by way of the second wireless access network 32. If the terminal 20 receives such a deactivation request, the criterion for returning to standby mode is considered to be met and said terminal 20 deactivates the first communication module 21.

Other types of criteria for returning to standby mode may be considered, and the choice of a particular criterion constitutes only an implementation variant of the invention.

Figure 3:
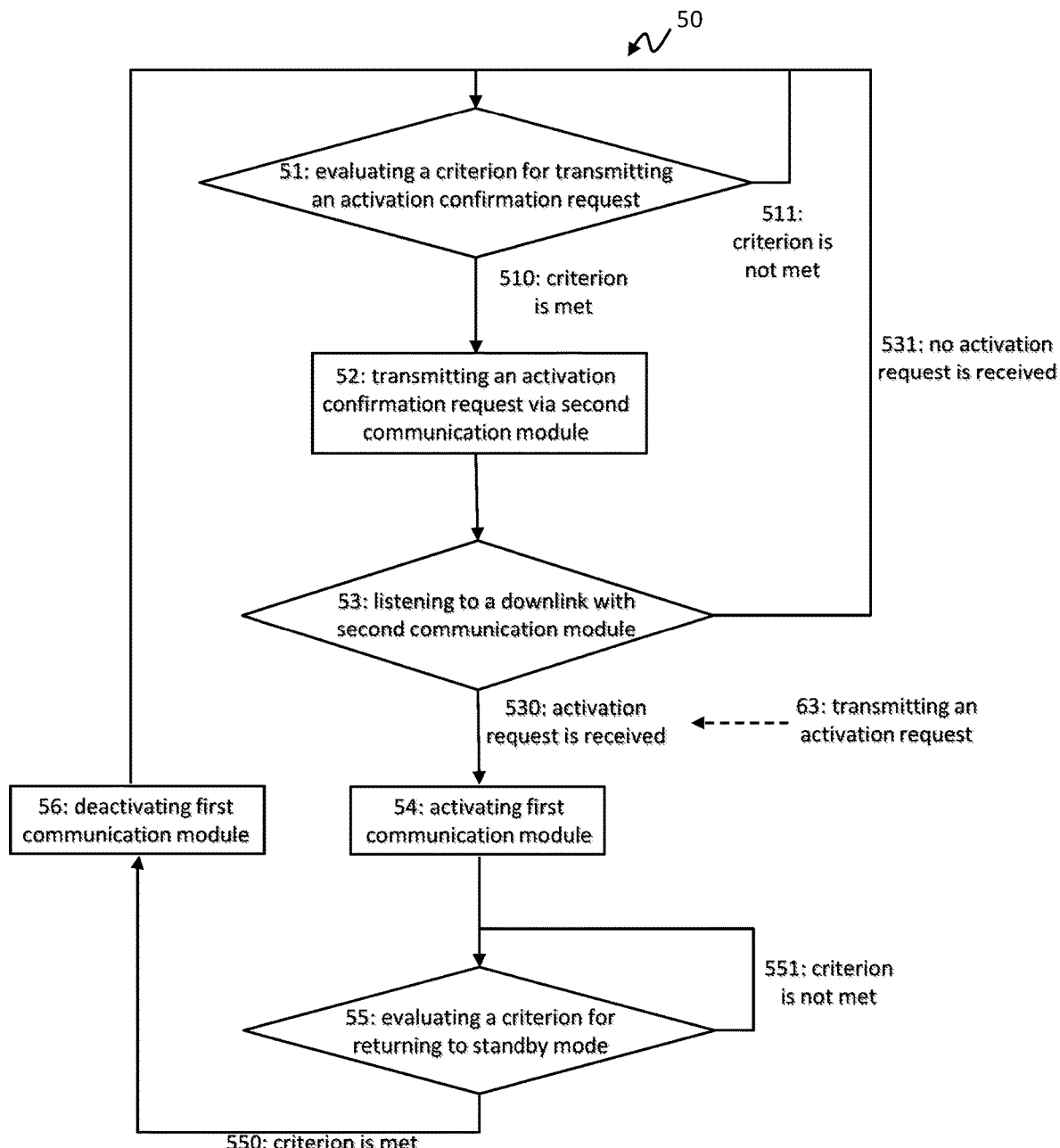
FIG. 3 shows a diagram illustrating a preferred mode of implementation of a method for controlling, by a terminal, a standby mode of a communication module of said terminal.

FIG. 3 shows a preferred mode of implementation of the method 50 for controlling a standby mode by the terminal 20. In the preferred mode of implementation illustrated by FIG. 3, the server 30 remotely controls the activation of the first communication module 21 of the terminal 20, but upon the initiative of said terminal 20. Specifically, when the terminal 20 contemplates activating its first communication module 21, it transmits, by way of the second communication module 22, an activation confirmation request to the server 30. Using this request, said terminal 20 asks the server 30 whether the first communication module 21 may or has to be activated. If the server 30 responds to this activation confirmation request with an activation request, the terminal 20 activates the first communication module 21. In the opposite case, the first communication module 21 of the terminal 20 remains in standby mode.

As illustrated by FIG. 3, the standby mode control method 50 includes, first of all, when the first communication module 21 is in standby mode, a step 51 of evaluating a predetermined criterion for requesting confirmation of activation of the first communication module 21.

Specifically, in order to limit the electrical consumption of the terminal 20, an activation confirmation request is advantageously transmitted only if predetermined conditions are satisfied, and the step 51 of evaluating said criterion for transmitting an activation confirmation request is intended precisely to determine whether these conditions are indeed satisfied.

For example, an activation confirmation request may be transmitted at predetermined dates. In particular, it is possible to transmit an activation confirmation request in a substantially periodic fashion, with a period Te. In this case, the criterion for transmitting an activation confirmation request is considered to be met when a period Te has elapsed since the previous transmission of an activation confirmation request. According to another example, it is also possible, as an alternative or in addition, to transmit an activation confirmation request when a validity limit date for data stored in memory in the terminal 20, for example firmware, has been exceeded. In this case, the activation of the first communication module 21 is intended to update said data whose validity limit date has been exceeded.

As an alternative or in addition, the criterion for transmitting an activation confirmation request may be considered to be met when it is determined that data for the terminal 20 have to be transmitted by way of the first communication module 21. The exchanges of data for the terminal 20 preferably take place mainly by way of the second communication module 22, and use of the first communication module 21 is limited to exchanges of a large amount of data, for example greater than a predetermined threshold value. However, in other examples, there is nothing to rule out using the second communication module 22 only to control the standby mode of the first communication module 21, which may then be used to carry out all of the other exchanges of data.

Other types of criteria for transmitting an activation confirmation request may be considered, and the choice of a particular criterion constitutes only an implementation variant of the invention.

As illustrated by FIG. 3, when the criterion for transmitting an activation confirmation request is met (reference 510 in FIG. 3), the standby mode control method 50 includes a step 52 of transmitting, by way of the second communication module 22, an activation confirmation request to the server 30.

In the opposite case, that is to say when the criterion for transmitting an activation confirmation request is not met (reference 511 in FIG. 3), no activation confirmation request is transmitted.

The second communication module 22 is also preferably in standby mode during the step 51 of evaluating the criterion for transmitting an activation confirmation request, in order to reduce the electrical consumption of the terminal 20. As the case may be, said second communication module 22 is activated when the criterion for transmitting an activation confirmation request is considered to be met, prior to step 52 of transmitting the activation confirmation request to the server 30.

As illustrated by FIG. 3, after having transmitted an activation confirmation request, the steps of the method 50 for controlling a standby mode by the terminal 20 correspond to the steps of the mode of implementation described with reference to FIG. 2.

It should be noted that the terminal 20 may be capable of implementing only one of the modes of implementation described with reference to FIGS. 2 and 3, or else be capable of implementing the two modes of implementation described with reference to FIGS. 2 and 3, that is to say be capable:

of transmitting an activation confirmation request, and
of receiving an activation request without having transmitted an activation confirmation request.

B) Method for Remote Control by the Server

Figure 4:
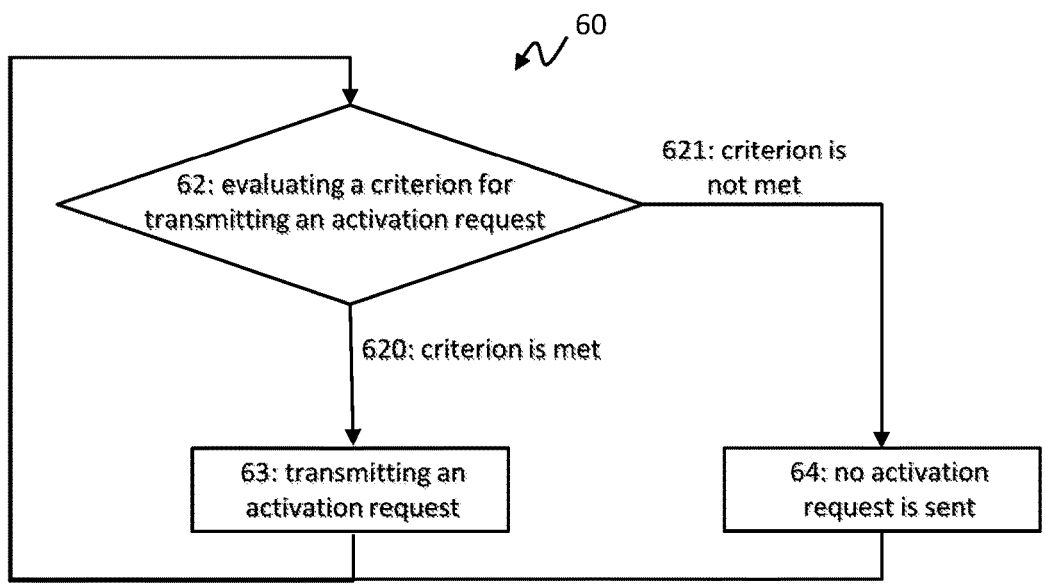
FIG. 4 shows a diagram depicting the main steps of a method for remotely controlling, by a server, a standby mode of a communication module of a terminal.

As indicated previously, the server 30 remotely controls the activation of the first communication module 21 of the terminal 20, and FIG. 4 schematically shows the main steps of the remote control method 60 implemented by said server 30.

To this end, the server 30 includes for example one or more processors and memory storage means (magnetic hard disk, electronic memory, optical disk, etc.) in which a computer program product, in the form of a set of program code instructions to be executed in order to implement the various steps of the remote control method 60, is stored in memory. In one variant, the server 30 includes one or more programmable logic circuits (FPGA, PLD, etc.), and/or one or more specialized integrated circuits (ASIC), and/or a set of discrete electronic components, etc., designed to implement all or some of said steps of the remote control method 60.

In other words, the server 30 includes means that are configured as software (specific computer program product) and/or hardware (FPGA, PLD, ASIC, discrete electronic components, etc.) in order to implement the various steps of the remote control method 60.

As illustrated by FIG. 4, the method 60 for remote control by the server 30 includes a step 62 of evaluating a predetermined criterion for transmitting an activation request to the terminal 20.

Specifically, in order to limit the electrical consumption of the terminal 20, an activation request is advantageously transmitted by the server 30 only if predetermined conditions are satisfied, and step 62 of evaluating said criterion for transmitting an activation request is intended precisely to determine whether these conditions are indeed satisfied.

When the criterion for transmitting an activation request is met (reference 620 in FIG. 4), the method 60 for remote control by the server 30 includes a step 63 of transmitting, by way of the second wireless access network 32, an activation request to the terminal 20.

In the opposite case, that is to say when the criterion for transmitting an activation request is not met (reference 621 in FIG. 4), no activation request is transmitted (step 64 in FIG. 3).

Figure 5:
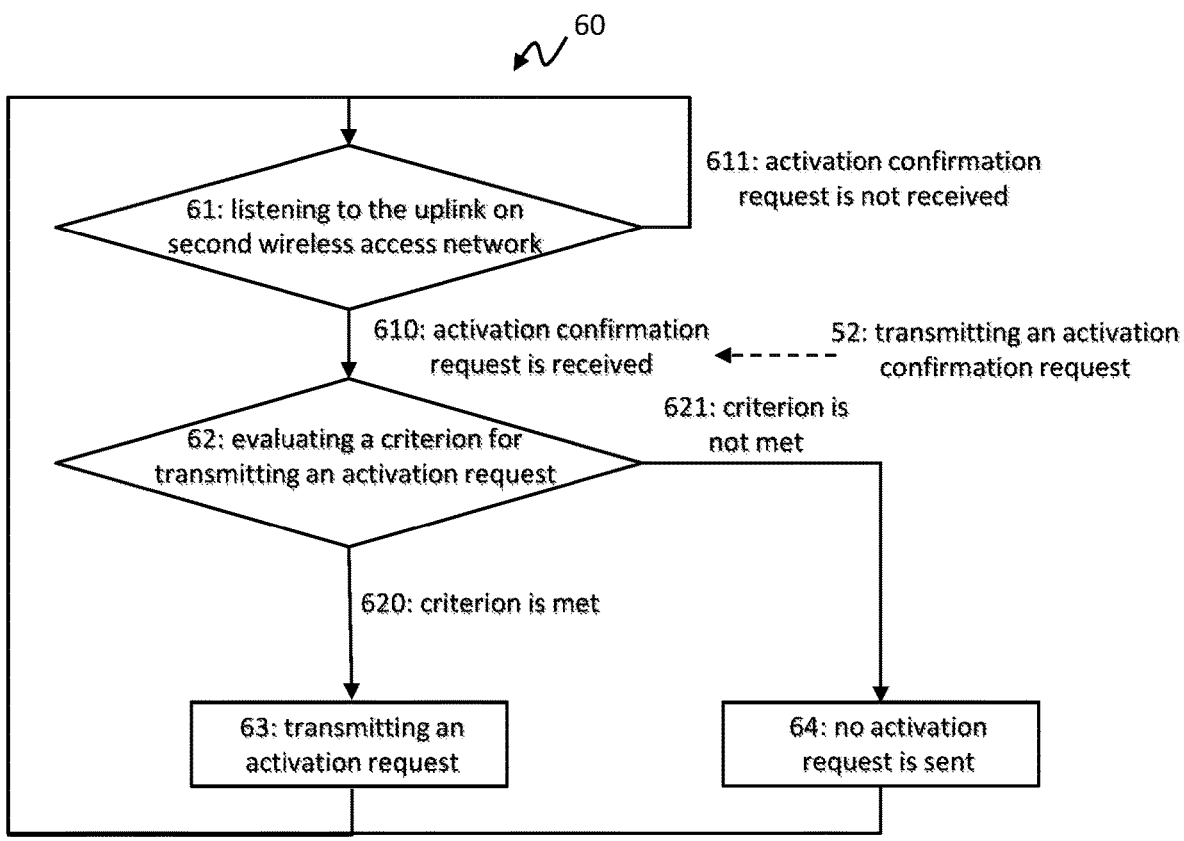
FIG. 5 shows a diagram depicting a preferred mode of implementation of a method for remotely controlling, by a server, a standby mode of a communication module of a terminal.

FIG. 5 shows the main steps of the remote control method 60, in the case where the terminal 20 initiates the activation procedure by transmitting an activation confirmation request, as described with reference to FIG. 3. In this case, and as illustrated by FIG. 5, the remote control method 60 includes a step 61 of listening to the uplink between the terminal 20 and the second wireless access network 32.

Step 61 of listening to the uplink is executed for as long as no activation confirmation request is received (reference 611 in FIG. 5).

When the server 30 receives an activation confirmation request (reference 610 in FIG. 5), said server 30 executes step 62 of evaluating the criterion for transmitting an activation request.

As before, when the criterion for transmitting an activation request is met (reference 620 in FIG. 5), the server 30 transmits, by way of the second wireless access network 32, an activation request to the terminal 20. In the opposite case, that is to say when the criterion for transmitting an activation request is not met (reference 621 in FIG. 5), no activation request is transmitted (step 64 in FIG. 5), that is to say no response is transmitted by the server 30, or else the server 30 responds to the terminal 20 but indicates that the first communication module 21 should not be activated.

Various types of criteria for transmitting an activation request may generally be considered, and the choice of a particular criterion constitutes only an implementation variant of the invention.

For example, if the terminal 20 does not have data to transmit by way of the first communication module 21, the transmission of an activation request may be conditional upon the presence, at the server 30, of data to be transmitted to the terminal 20 by way of the first wireless access network 31. In such a case, the activation may be initiated by the server 30 (FIGS. 2 and 4) or, if it is initiated by the terminal 20 (FIGS. 3 and 5), the transmission of the activation confirmation request by the terminal 20 is intended primarily to determine whether the server 30 has data to convey to it by way of the first wireless access network 31.

As an alternative or in addition, the transmission of an activation request may be conditional upon the ability of the server 30 to exchange data with the terminal 20 by way of the first wireless access network 31. For example, the first wireless access network 31 and/or the server 30 may be configured to accept the connection of a new terminal 20 to the first wireless access network 31 as long as the level of use, by other terminals, is lower than a predetermined maximum level. Thus, if the maximum level is reached, the terminal 20 will not be able to connect to the first wireless access network 31 and/or to the server 30, such that there is no need to activate the first communication module 21. In such a case, if the activation is initiated by the terminal 20 (FIGS. 3 and 5), the transmission of the activation confirmation request by the terminal 20 is intended primarily to check the availability of the first wireless access network 31 and of the server 30 before activating its first communication module 21.

It should be noted that, in preferred modes of implementation, the terminal 20 may belong to a group of terminals 20 sharing one and the same identification code for the first wireless access network 31. In other words, the terminals 20 belonging to this group use the same identification code to connect to the first wireless access network 31.

Such provisions are particularly advantageous in that they make it possible to greatly reduce the costs associated with using the first communication module 21, as these costs are shared between all of the terminals 20 of said group. In such a case, the standby mode is also intended to enable said identification code to be shared by a group of terminals 20. Specifically, as a terminal 20 in standby mode is not permitted to exchange data with the first wireless access network 31, it has released the shared resource, i.e. the identification code, which can be used by one of the other terminals 20 belonging to the same group.

In the remainder of the description, a case is considered, in a nonlimiting manner, in which the terminals 20 of said group use one and the same IMSI subscriber number to connect to the first wireless access network 31. However, in other examples, there is nothing to rule out considering other types of identification codes (like for example, MAC addresses, IP addresses or multicast group identificers), and the choice of a particular type of identification code to be shared between the various terminals 20 of the group constitutes only an implementation variant of the invention.

To this end, the terminals 20 of said group may be equipped with respective SIM ("Subscriber Identity Module") cards that are identical in that they all store the same IMSI subscriber number in memory. Each terminal 20 of the group is thus able to connect to the first wireless access network 31 using the shared IMSI subscriber number, and therefore the associated MSISDN ("Mobile Station International Subscriber Directory Number") number. By contrast, at any instant in time, there may not be more than one terminal 20 of said group connected to said first wireless access network 31 using said shared IMSI subscriber number, and the server 30 advantageously controls access, by the terminals 20 of said group, to the use of the shared IMSI subscriber number. In such a case, the transmission of an activation request by the server 30 may be conditional upon the availability of the shared IMSI subscriber number. To this end, the server 30 stores in memory for example a list of the terminals 20 of said group and the IMSI subscriber number associated with said group, and also, when said IMSI subscriber number is being used by a terminal 20 of said group, the identity of this terminal 20. As a result, evaluating the criterion for transmitting an activation request in this case includes determining whether the IMSI subscriber number associated with the terminal 20 to which the activation request has to be sent is being used by another terminal of the same group, and the criterion for transmitting an activation request is considered to be met if it is determined that said IMSI subscriber number is available. By transmitting the activation request, the server 30 therefore indicates to the terminal 20 that the shared IMSI subscriber number is available. In such a case, if the activation is initiated by the terminal 20 (FIGS. 3 and 5), the transmission of the activation confirmation request by the terminal 20 is intended primarily to check the availability of the shared IMSI subscriber number before activating its first communication module 21.

It should be noted that, if one and the same IMSI subscriber number is shared by a group of terminals 20, the server 30 should preferably be informed when a terminal 20 stops using said shared IMSI subscriber number. This is the case when the server 30 transmits, by way of the first wireless access network 31 or of the second wireless access network 32, a request to deactivate the first communication module 21. By contrast, when the terminal 20 decides to deactivate the first communication module 21, for example when the criterion for returning to standby mode is met, it may inform the server 30 of this deactivation, by way of the first communication module 21 (before the deactivation) or by way of the second communication module 22. As an alternative or in addition, the server 30 may be linked to the first wireless access network 31 such that it is able to be informed of the disconnection between the terminal 20 and the first wireless access network 31.

It should also be noted that one and the same group of terminals 20 may, in particular modes of implementation, share a plurality of IMSI subscriber numbers (or a plurality of identification codes if another type of identification codes are used like MAC addresses, IP addresses or multicast group identifiers) in order to connect to the first wireless access network 31. Such provisions make it possible to facilitate access to the first wireless access network 31, in particular in the case of a group containing a large number $N_T$ of terminals 20, while at the same time lowering the cost associated with using the first communication module 21 when the number $N_C$ of shared IMSI subscriber numbers is lower than the number $N_T$ of terminals of the group. In such a case, evaluating the criterion for transmitting an activation request includes determining whether at least one of the $N_C$ shared IMSI subscriber numbers is available, and said criterion for transmitting an activation request is considered to be met if it is determined that one of said $N_C$ shared IMSI subscriber numbers is available. As the case may be, the transmitted activation request may indicate which available IMSI subscriber number said terminal 20 should use to connect to the first wireless access network 31.

More generally, it should be noted that the modes of implementation and embodiments considered above have been described by way of non-limiting example, and that other variants are therefore conceivable.

In particular, the invention has been described considering that the first wireless access network 31 and the second wireless access network 32 are both wireless wide area networks (WWAN). However, the invention may be applied to other types of wireless networks, including in particular wireless local area networks (IEEE 802.11, WiFi, Bluetooth, etc.) or NB-IOT networks. The use of wireless wide area networks is however advantageous in that it makes it possible to limit needless waking of the first communication module 21 and/or of the second communication module 22.

Furthermore, the invention has been described considering that the server 30 is linked both to the first wireless access network 31 and to the second wireless access network 32. However, if the data exchanged by the first communication module 21 and the first wireless access network 31 should not transit by the server 30, then said server 30 may be linked only to the second wireless access network 32. This is the case in particular if the server 30 manages only the remote control of the standby mode of the first communication module 21 of the terminal 20.

It should furthermore be noted that an activation request transmitted by the server 30 to a terminal 20 may also include, in particular modes of implementation, additional information for the attention of said terminal 20. In particular, the server 30 may indicate that said terminal 20 should comply with a delay before activating the first communication module 21 and/or before attempting to connect to the first wireless access network 31, in order for example to enable the first wireless access network 31 and the server 30 to be available again to exchange data with the terminal 20.

The duration of said delay may be predetermined and/or included in the activation request transmitted by the server 30.

The above description clearly illustrates that, through its various features and the advantages thereof, the present invention achieves the aims that it set itself. In particular, the present invention makes it possible in particular to avoid activating the first communication module 21 of the terminal 20 when there are no data to be received by way of the first wireless access network 31, but also when the first wireless access network 31 and/or the server 30 are not available to exchange data, or when an identification code of the terminal 20 for the first wireless access network 31, which code is shared with other terminals, is not available.

The invention claimed is:

1. A method for controlling, by a processor-based terminal, a standby mode of a first communication module of the terminal,
   wherein the first communication module is configured to exchange data with a first wireless access network, the terminal comprising a second communication module configured to exchange data with a second wireless access network, the second communication module having a maximum throughput lower than a maximum throughput of the first communication module;
   wherein the terminal belongs to a group of terminals sharing a set of one or several identification codes for connecting to the first wireless access network;
   wherein the control method comprises:
      listening to a downlink between the second wireless access network and the terminal by the second communication module in response to a determination that the first communication module is in the standby mode;
      receiving, via the second communication module, an activation request transmitted by a processor-based server linked to the second wireless access network, wherein said activation request comprises an available identification code from among the set of shared identification codes;
      activating the first communication module by the terminal to connect the first communication module to the first wireless access network using the identification code;
      evaluating a criterion for returning to the standby mode in response to a determination that the first communication module is in an active mode; and
      deactivating the first communication module in response to a determination that the criterion for returning to the standby mode is met.

2. The control method of claim 1, wherein the set of shared identification codes are IMSI subscriber numbers, MAC addresses, IP addresses or multicast group identifiers.

3. The control method of claim 1, wherein the evaluation of the criterion for returning to the standby mode comprises determining whether the data must be exchanged via the first communication module.

4. The control method of claim 1, wherein the evaluation of the criterion for returning to the standby mode comprises comparing an instant in time of the evaluation of the criterion for returning to the standby mode with a predetermined date.

5. The control method of claim 1, wherein the evaluation of the criterion for returning to the standby mode comprises analyzing a level of electrical energy stored in a battery of the terminal.

6. The control method of claim 1, wherein the first wireless access network and the second wireless access network are both wireless wide area networks.

7. The control method of claim 1, wherein the first communication module is compatible with at least one of the following wireless communication protocols: GPRS, EDGE, UMTS, HSPA, HSPA+, LTE, and CDMA2000, IEEE 802.11, WiFi, Bluetooth, NB-IoT.

8. The control method of claim 1, wherein the second communication module transmits data in the form of ultra-narrowband signals.

9. A terminal of a wireless communication system, comprising
   a first communication module configured to exchange data with a first wireless access network;
   a second communication module configured to exchange data with a second wireless access network, a maximum throughput of the second communication module being lower than a maximum throughput of the first communication module;
   wherein the terminal belongs to a group of terminals sharing a set of one or several identification codes to connect to the first wireless access network;
   a processor configured to:
      listen to a downlink between the second wireless network and the terminal via the second communication module in response to a determination that the first communication module is in a standby mode;
      receive, via the second communication module, an activation request transmitted by a processor-based server linked to the second wireless access network, wherein the activation request comprises an available identification code from among the set of shared identification codes;
      activating the first communication module to connect the first communication module to the first wireless access network using the identification code;
      evaluate a criterion for returning to the standby mode in response to a determination that the first communication module is in an active mode; and
      deactivate the first communication module in response to a determination that the criterion for returning to the standby mode is met.

10. A method for remotely controlling a standby mode of a first communication module of a processor-based terminal by a processor-based server, the server being linked to a second wireless access network and the first communication module being controlled by the terminal in accordance with claim 9, the remote control method comprising:
    evaluation of a criterion for transmitting the activation request to activate the first communication module of the terminal, the evaluation comprises determining whether an identification code, among a set of one or several identification codes shared by the group of terminals to which the terminal belongs, is available for use by the terminal to connect to the first wireless access network; and
    transmission of the activation request to the terminal via the second wireless access network in response to a determination that the criterion for transmitting the activation request is met.

11. The method of claim 10, wherein the set of shared identification codes are IMSI subscriber numbers, MAC addresses, IP addresses or multicast group identifiers.

12. A server to remotely control a standby mode of a first communication module of a processor-based terminal according to claim 9; and wherein the server comprises a processor configured to:
- evaluate a criterion for transmitting an activation request to activate the first communication module of the terminal, the evaluation comprises determining whether an identification code from among the set of identification codes is available for use by the terminal to connect to the first wireless access network; and
- transmit the activation request to the terminal via the second wireless access network in response to a determination that the criterion for transmitting the activation request is met.

13. A wireless communication system comprising a group of terminals, each terminal as claimed in claim 9, and a server to remotely control the standby mode of the first communication module of said each terminal, the server being linked to the second wireless access network, the server comprising a processor configured to:
- evaluate a criterion for transmitting the activation request to activate the first communication module of said each terminal, the evaluation comprises determining whether an identification code, from among the set of identification codes shared by the group of terminals, is available for use by said each terminal to connect to the first wireless access network; and
- transmit the activation request to said each terminal via the second wireless access network in response to a determination that the criterion for transmitting the activation request is met.

* * * * *